US006865498B2

(12) United States Patent
Hardesty (10) Patent No.: US 6,865,498 B2
(45) Date of Patent: Mar. 8, 2005

(54) SYSTEM FOR CALIBRATING THE AXES ON A COMPUTER NUMERIC CONTROLLED MACHINING SYSTEM AND METHOD THEREOF

(75) Inventor: Michael P. Hardesty, Dale, IN (US)

(73) Assignee: Thermwood Corporation, Dale, IN (US)

( * ) Notice: Subject to any disclaimer, the term of this patent is extended or adjusted under 35 U.S.C. 154(b) by 78 days.

(21) Appl. No.: 09/997,880

(22) Filed: Nov. 30, 2001

(65) Prior Publication Data

US 2003/0105603 A1 Jun. 5, 2003

(51) Int. Cl.[7] .............................................. G06F 19/00
(52) U.S. Cl. ........................................................ 702/95
(58) Field of Search .............................. 702/95, 105, 1; 45/5; 409/283; 700/195; 318/571, 443, 254; 76/80; 378/4; 356/138; 73/618; 156/397; 29/739; 430/22; 382/100

(56) References Cited

U.S. PATENT DOCUMENTS

| | | | | |
|---|---|---|---|---|
| 4,203,062 A | * | 5/1980 | Bathen ........................ | 318/571 |
| 4,287,793 A | * | 9/1981 | Silvey ......................... | 76/80.5 |
| 4,513,540 A | * | 4/1985 | Dzewaltowski et al. ....... | 451/5 |
| 4,977,512 A | * | 12/1990 | Nakagawa .................... | 700/195 |
| 5,192,174 A | * | 3/1993 | Hartmann .................... | 409/283 |
| 5,699,273 A | * | 12/1997 | Hinzpeter et al. .......... | 702/105 |

* cited by examiner

Primary Examiner—John Barlow
Assistant Examiner—Tung S Lau
(74) Attorney, Agent, or Firm—Stevens, Davis, Miller & Mosher, LLP (57) ABSTRACT

A method and system for calibrating a machine capable of automatically calibrating the axes of the machine by comparing an initial calibration state of a particular axis with a subsequent motion of the machine along the same axis. The machine adjusts the motion along such axis based on the angular displacement by modifying the reference data in the computer memory of the machine to accord with the subsequent motion along the axis.

17 Claims, 5 Drawing Sheets

SYSTEM FOR CALIBRATING THE AXES ON A COMPUTER NUMERIC CONTROLLED MACHINING SYSTEM AND METHOD THEREOF

FIELD OF THE INVENTION

The present invention discloses a system for accurately calibrating one or more axes on a multiple axis machining system.

BACKGROUND OF THE INVENTION

A computer numeric controlled machining system, hereinafter referred to as a CNC machining system, comprises a movable toolhead support assembly which traverses left to right along a horizontal beam or gantry in the x direction. Mounted to the movable toolhead support assembly is a toolhead, adapted to be displaced in a vertical or z direction on a set of rails, and generally fitted with an electric routing spindle. A worktable is situated beneath the toolhead, the surface of which is situated parallel to the x-y plane. Moving the gantry to which the tool carrier is mounted, or on some machines, moving the worktable itself, effects movement in the y direction. On certain machines, instead of a toolhead being mounted to the toolhead support assembly, a vertical column, displaceable in the z-axis direction, may be affixed thereto. A toolhead, comprising a rotating c-axis assembly, and a rotating a-axis assembly, is mounted thereon. All of the axes, along with the toolhead, are calibrated to have a specific angular and linear displacement with respect to a predetermined reference point.

A considerable amount of time and skilled labor are required to achieve an acceptable state of calibration for the machine as described. The state of calibration must be maintained in order to achieve satisfactory performance from the machine. Over a period of time, in the course of normal machine use, or in the event of an accidental collision of the tool head, it is possible for one or more of the various components to move out of alignment. When an event such as this occurs, lengthy calibration procedures must be performed in order to bring the machine back into an acceptable state of calibration. This not only consumes skilled resources, but also results in the loss of the use of the machine. The present invention provides a solution to this problem by providing for automatic calibration compensation by means of software-controlled modification of the servo positioning loop data.

SUMMARY OF THE INVENTION

The principal object if the present invention is to provide for the calibration of one or more axes of a CNC machining system to achieve an acceptable state of calibration. Another object is to provide method for automatically calibrating a CNC machining system, utilizing a computer numerical controller, in conjunction with preset reference points. A further object is to provide a method for automatically calibrating a CNC machining system, utilizing a digital probing device. A still further object is to substantially reduce the amount of time and manpower resources required to calibrate a CNC machining system. Another object is to provide for the use of calibration information to perform multiple-axis compensation on a CNC machining system. A further object is to provide a method for performing programmed motions accurately on a CNC machining system without the use of mechanical alignments.

This invention achieves these and other objects by providing a method and system for calibrating a machine. The machine's computer moves a probe along an absolute traversing path touching a reference surface. Data relating to the relative angular displacement between the reference surface and the traversing path are recorded. The machine's computer then determines a correction angular displacement between an initial calibration of the toolhead of the machine when the machine is in its best state of calibration with the data recorded during movement along the absolute traversing path. The machine then calibrates the axis to account for the correction angular displacement in order to bring the machine back into an acceptable state of calibration with respect to this axis. This process is repeated for the other axes. Also disclosed is a system to carry out such process.

BRIEF DESCRIPTION OF THE DRAWINGS

The above and other features of the present invention will become readily apparent to those skilled in the art from the detailed description which follows and from the accompanying drawings, in which.

DETAILED DESCRIPTION OF THE INVENTION

Figure 1:
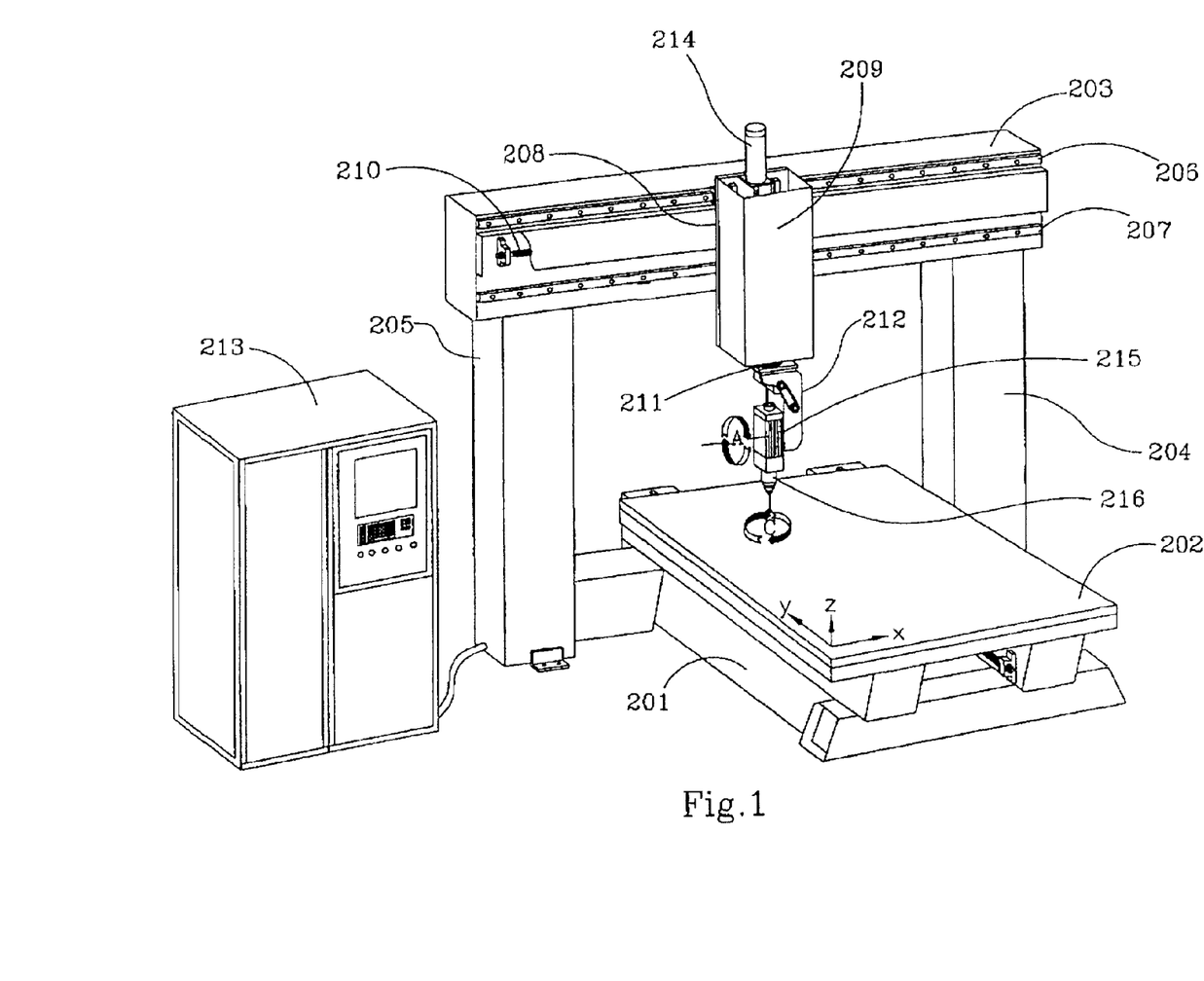
FIG. 1 is a perspective view of a computer numeric controlled machining system with which the inventive method may be practiced.

Referring to FIG. 1, there is illustrated a CNC machining system, which generally includes a base member 201, a worktable 202 and a gantry 203, comprising a transverse section spanning above the worktable, supported by two leg members 204 and 205. The base member is formed of steel sections welded together to provide a rigid and stable foundation. Worktable 202 is mounted with a surface parallel to the x-y axis plane and is adapted to be displaced longitudinally relative to the base member. The front face of transverse section 203 is provided with a pair of vertically spaced, transversely disposed rails 206 and 207 on which the toolhead support assembly 208 is mounted and displaceable transversely or along the x-axis. Instead of the worktable being displaceable and the gantry being stationary as described, the worktable may be stationary and the gantry may be displaceable along the Y-axis to provide displacement between the gantry and the worktable. A z-axis column 209 is mounted on the toolhead support assembly and is adapted to be displaced vertically along the z-axis. Mounted to the bottom of the Z-axis column is a support bracket 211 rotatable about a vertical c-axis. Affixed to support bracket 211 is a depending bracket 212. An electric routing spindle 215 is mounted on the depending bracket 212 and rotatable about a horizontal a-axis. Mounted on the spindle is a digital calibration probe 216. Each of the aforementioned components can be controllably rotated about their respective axes by as much as 360 degrees. Each of worktable 202, toolhead support assembly 208 and z-axis support column 209, is displaceable along its respective axis by a feed-screw arrangement, driven by an AC servomotor. Each of the brackets 211 and 212 is provided with an AC servomotor in combination with a gear and belt drive system, and each is displaceable rotationally about its respective fixed axis by the same. The operation of all of the aforementioned servomotors is controlled by a programmable computer-numeric controller 213 which comprises a digital computer, a servo drive controller and a plurality of input and output ports. The controller generates positional data based on programs that may be entered through various means including, a keyboard, a detachable hand held pendant or an automatic probing system. Programs may also be generated off-line using a CAD-CAM system, then entered into the control through a local area network connection or by loading from magnetic storage media. A cutter or tool bit is installed in a collet on the bottom end of the electric spindle. A workpiece, the surface of which may be curved, flat, or multi-faceted in configuration, is placed on the worktable. The machine is programmed to be controllably moved in such a manner as to effect precise machining of one or more surfaces of the workpiece. The machining of the workpiece may include drilling, milling, cutting or any combination thereof. The machining operation may utilize the motion along or about any of the above-mentioned linear and/or rotational axes, either individually or in groups. Machining may be effected at any angle to the x-y plane, in any location within the work envelope.

Mechanical calibration of such a machine comprises the steps of:
a) adjusting the traversing path of the y axis to ensure perpendicularity of the same relative to the traversing path of the x-axis, and parallelism of the same relative to the x-y plane;
b) adjusting the traversing path of the x axis to ensure perpendicularity of the same relative to the traversing path of the y-axis and parallelism of the same relative to the x-y plane;
c) adjusting the z-axis to achieve traversing perpendicularity, relative to the x-axis and y-axis and the x-y plane;
d) adjusting the c-axis to achieve perpendicularity of the rotational axis of same, relative to the x-y plane;
e) adjusting the a-axis to achieve perpendicularity of the rotational axis of same, relative to the rotational axis of the c-axis;
f) adjusting the spindle mounting plane to achieve precise axial alignment of the centerline of the spindle relative the centerline of rotation of the c-axis when the spindle rotational centerline is perpendicular to the x-y plane;
g) adjusting the a-axis home reference switch to insure that the rotational centerline of the spindle is parallel with the x-y plane when the "a" axis is in the 90° position; and
h) adjusting the c-axis home reference switch to insure that the rotational centerline of the spindle is in alignment with the traversing path of the y-axis when both the a-axis and the c-axis are moved to their respective 90° positions.

Based on the foregoing description, it is obvious that the calibration procedure is quite extensive, and requires the services of a skilled technician. Under the conventional art, following a crash or excessive load on the machine, the operator would have to repeat this process to bring the machine back into an acceptable state of calibration which can be very time consuming. The invention disclosed herein utilizes the aforementioned computer numeric controller, in combination with an electronic measuring probe, to automatically achieve an acceptable state of calibration without the need for mechanical adjustments or skilled technical expertise.

Figure 2:
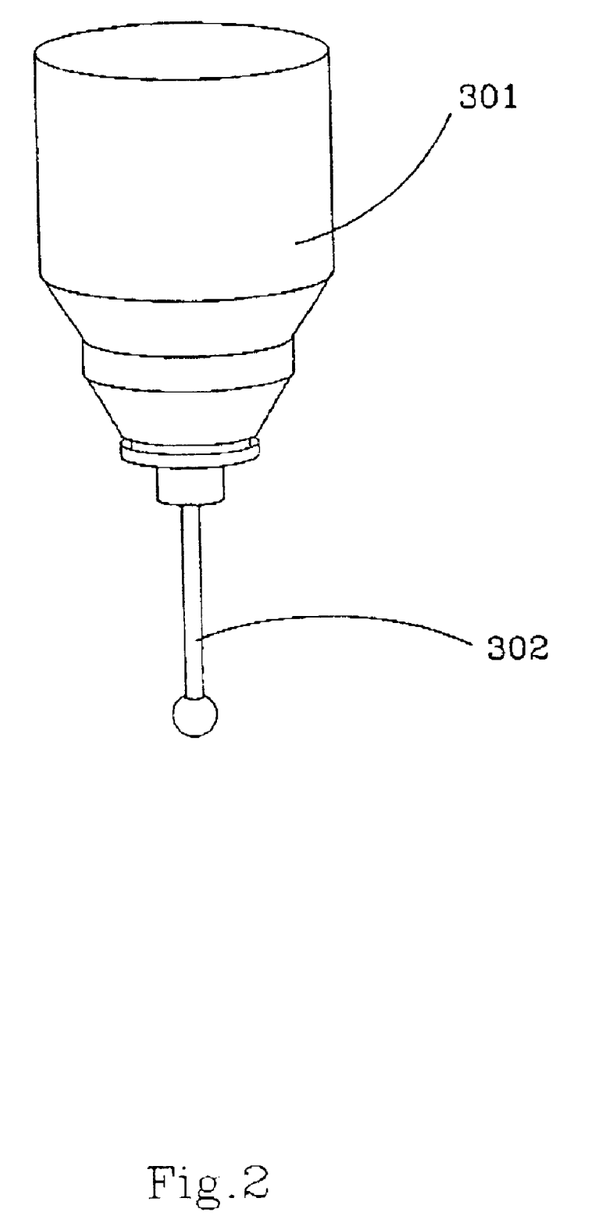
FIG. 2 is an enlarged, perspective view of a digital measuring probe utilized in the practice of the present invention.

FIG. 2 illustrates an electronic measuring probe utilized in the calibration procedure. Such probe comprises principally, a movable stylus 302 pivotally mounted on the bottom of a cylindrical base member 301, spring centered in axial alignment with the same. The stylus is adapted to be displaced omni-directionally in pivotal relationship with the stylus mounting point as well as in the Z axis direction. The stylus is operatively connected to a digital displacement transducer located within the cylindrical body of the probe. The displacement of the stylus in any direction causes the transducer to transmit a digital pulse signal corresponding proportionally to the direction and magnitude of the displacement. An example of such a probe is a Renishaw model SP2-1, a device well known in the art.

A typical CNC machine has three axes of linear motion, designated x, y, and z. The x and y-axes are arranged perpendicular to one another and travel on a horizontal plane while the z-axis travels perpendicular to such horizontal plane.

Figure 3:
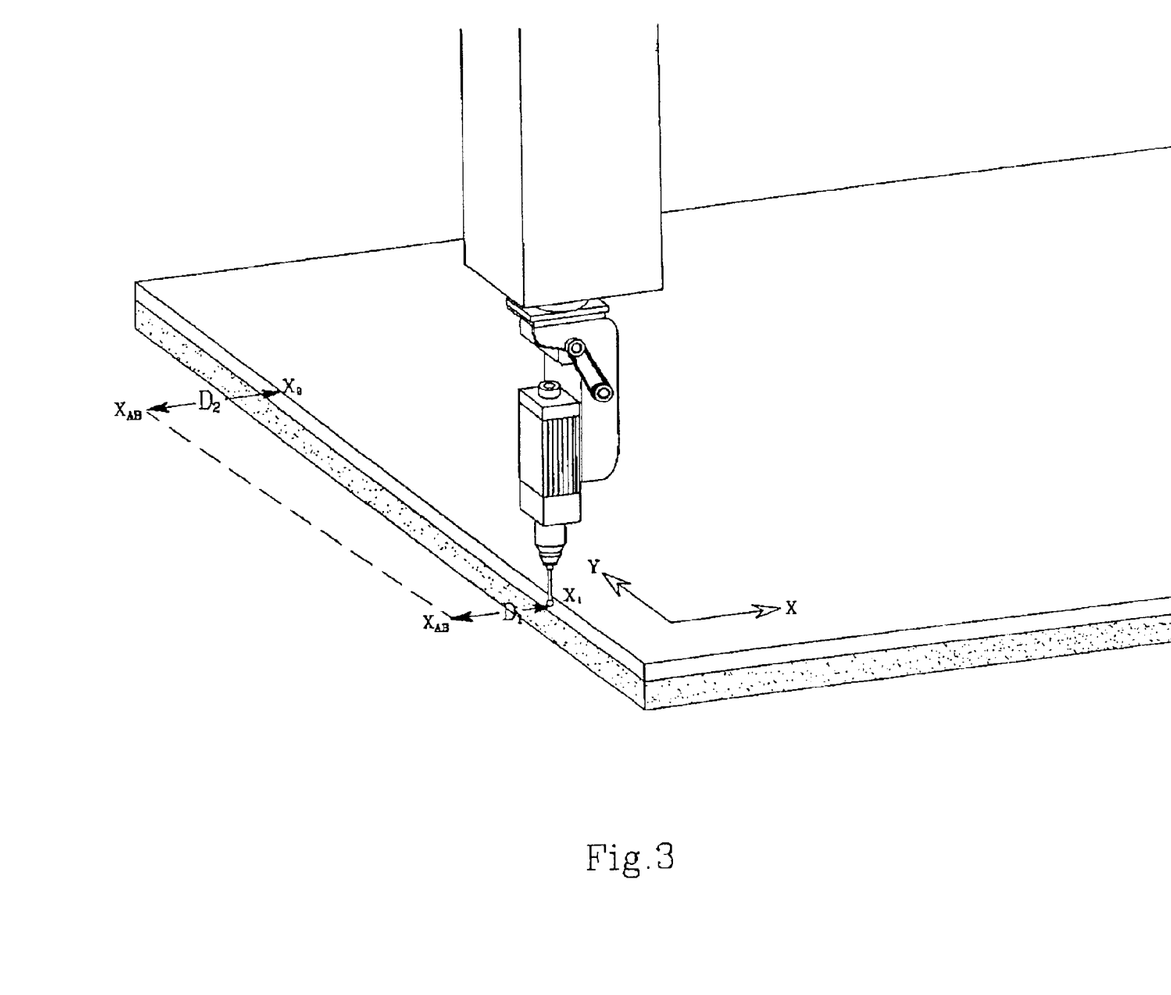
FIG. 3 a perspective view of a work piece and the probe as shown in FIG. 2, illustrating a relationship between the correct traversing path of a linear axis and a skewed representation of the same.
Figure 5:
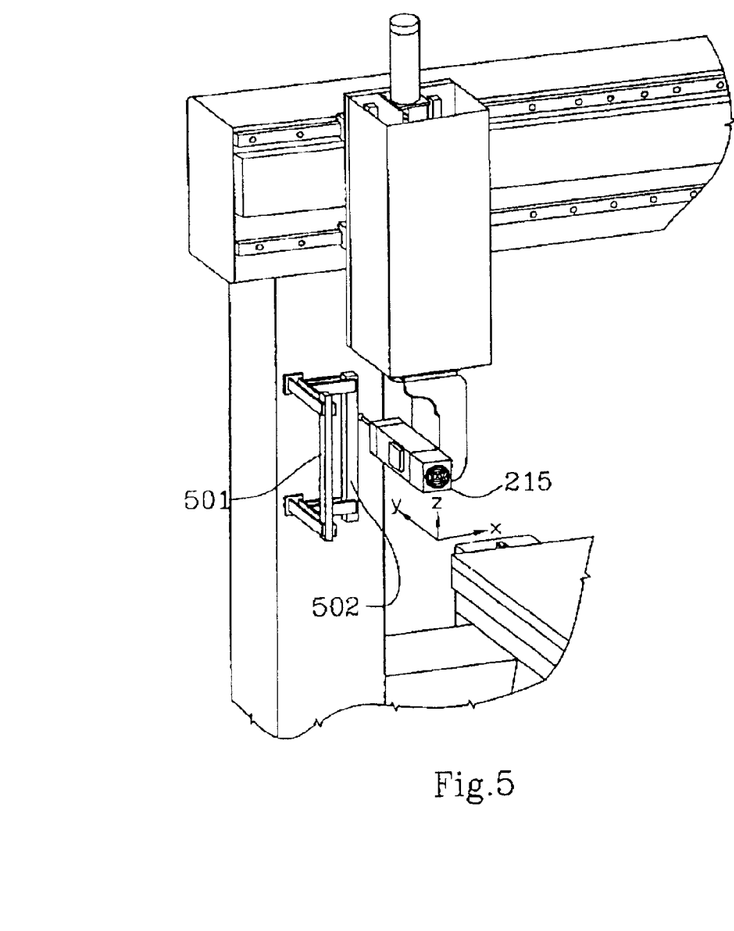
FIGS. 5 and 6 are partial perspective views of the machine shown in FIG. 1, illustrating a z-axis calibration reference fixture.
Figure 6:
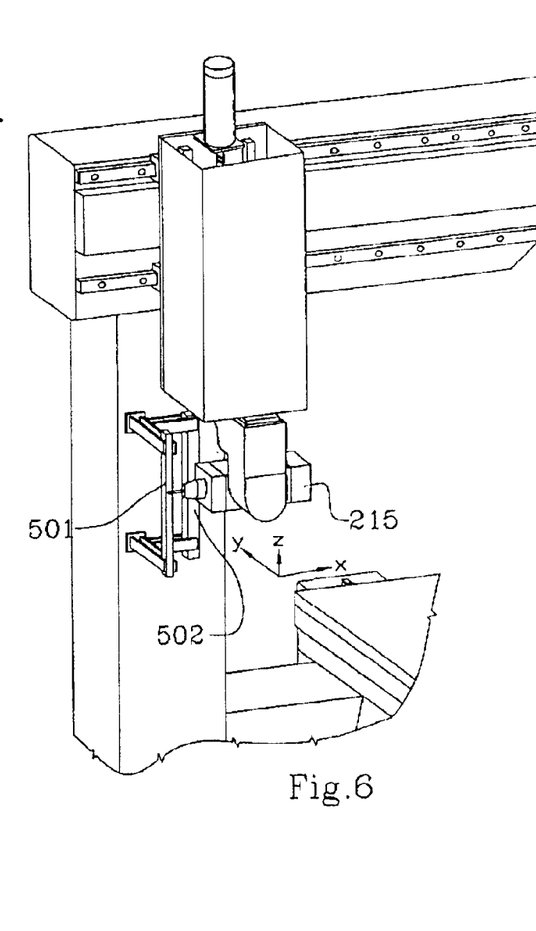

The angular displacement between the traversing paths of the x and y axes, relative to the front and left edges of the worktable must be determined as a prerequisite to automatic machine calibration. Such a procedure is shown in FIG. 3. This determination is necessary because the worktable edges will be utilized as reference points for future calibration. The physical edges of the worktable are, in all probability, not in perfect alignment with the traversing paths of the x and y-axes. However, the worktable is a solid device and it can therefore be assumed with a reasonable degree of certainty that the physical shape and the angular displacements between various edges of the table will not change. As shown in FIGS. 5 and 6, in the case of the z-axis, a vertical calibration fixture is installed on a gantry support column as a permanent machine component. Such fixture comprises two vertically disposed reference members 501 and 502, and a support bracket. Such reference members project from the gantry support member to provide for displacement of the probe 216 when the machine travels along an absolute traversing path. After the traversing paths of the x and y and z-axes have been mechanically calibrated and are determined to be perpendicular to one another, the next step is to establish absolute reference points in the x-y and x-z and y-z planes that correspond with the traversing paths of the x and y axes relative to the perpendicular edges of the worktable, and the z-axis relative to a preset vertical reference surfaces, then calculate a reference slope of change for each axis based on these points.

When the aforementioned relationships have been established, the data, which represents the angular offset of the traversing paths of the x, y and z-axes in their best state of calibration relative to fixed reference points, is stored in the calibration reference table. The calibration reference table is assembled at the time of machine construction in the following manner.

First, the x, y, and z axes are mechanically calibrated by the machine operator by the extended procedure provided above. This insures a proper calibration of the machine before the calibration reference table is created. Then the aforementioned calibration probe is mounted to the workhead of the CNC machining center. The workhead is controllably moved to the x or y reference surface until the stylus is displaced by a predetermined amount at a predetermined absolute position. The stylus is then retracted from the reference surface by a predetermined amount, advanced forward, then moved toward the reference surface again to a second absolute position. The two absolute positions represent an absolute traversing path for movement of the toolhead for the calibration process. These two contact points are necessary in order to calculate the slope between the absolute traversing path and the fixed, mechanical reference surface, which provides an initial angular displacement for the particular axis.

Calibration data collection for the z-axis differs somewhat from data collection for the x and y-axes. Because there is no means for providing linear displacement along the y-axis between the gantry support and the z-axis assembly, displacement for calibrating the z-axis in the y-z plane is provided by rotating the c-axis in order to effect contact between the calibration probe tip and each of the z-axis reference members.

Data for the z-axis calibration reference table is collected by first rotating routing spindle about the a-axis into a position wherein the centerline of the routing spindle 215 and the probe 216 is parallel with the x-y plane and axially aligned with the traversing direction of the y-axis as shown in FIG. 5. The ball of the stylus 302 of probe 215 is brought in to contact with reference member 502. The toolhead assembly is moved along an absolute traversing path corresponding to the z-axis. While the toolhead moves, the probe 215 touches the reference member 502 in at least two points and the machine controller uses data collected to determine the slope between the absolute traversing path and the reference member 502. The collected data is then stored in the calibration reference table. Routing spindle and probe 216 are then rotated about the c-axis away from reference member 502 so the centerline of probe 215 is approximately at 45° angle to the y-axis traversing plane. Routing spindle 216 and probe 215 are then rotated 180° about the a-axis. Then routing spindle 216 and probe 215 are rotated about the c-axis, this time the ball of stylus 302 of probe 215 is brought into contact with reference number 501 as shown in FIG. 6. The toolhead assembly is again moved along the absolute traversing path corresponding to the z-axis. While the toolhead moves, the ball of the stylus 302 of probe 215 touches the reference member 501 in at least two points and the machine controller uses data collected to determine the slope between the absolute traversing path and the reference member 501. The collected data is then stored in the calibration reference table. This process may be repeated to obtain a desired number of probed contact points. The slope between the absolute traversing path and the reference member 501 and the slope between the absolute traversing path and the reference surface member 502 are used to determine two initial angular displacements for the z-axis.

All of the absolute x-y-z positions are being monitored continuously in the machine control. Each time the stylus of probe 216 contacts a reference surface or member, a signal is sent to the machine control and the absolute position along the absolute position in x-y-z space along the absolute traversing path is recorded along with the displacement of the stylus of the probe. Any variation between the absolute traversing path corresponding to an axis and the corresponding reference surface will result in the various points of the stylus contact having different x-y, x-z, or y-z locations. The object is to record the various contact point positions, then calculate the slope of change that exists between each of the reference surfaces and the absolute traversing path of each corresponding axis, then record the data in the calibration reference table. The data stored in the calibration reference table represents the angular offset of each axis, expressed as the slope of change, relative to its respective reference surface when the machine is in the best state of calibration. The data will be compared with the data obtained during an automatic calibration routine to calculate any angular offsets that may have developed between the traversing paths of the x, y, and z-axes. These later detected angular offsets are stored in the previously mentioned correction reference table.

In the course of normal use of the machine, the initial setups of the x, y and z-axes might be altered due to either crashes or excessive loads, among other reasons. Therefore, the correction reference table may be outdated due to the presence of further offsets. Unless the correction reference table is modified to take the further offsets into consideration, the CNC machine cannot function in accordance with a true coordinate system whereby the linear traversing axes are at a perfect right angle with one another. From empirical data, it is known that the further offsets are typically due to unwanted movements of the base member 201 and the gantry 203. The further offset from the original calibration may be in the order of a thousandth of an inch. Instead of mechanically adjusting the z-axis support column or base member relative to the gantry, which is rather difficult due to the amount of minute corrections needed, it is much less complicated to adjust orders of thousandths of an inch by updating the correction reference table, so that the traveling paths of the X, Y and Z-axes will be in correct relationship with one another.

The process for obtaining the offset data is in essence, the same as that which is used to obtain the reference data described in previous paragraphs. For example, the exact amount of further offset of the y-axis may be obtained by picking two absolute points along the absolute traversing path corresponding to the y axis, $X_1$ and $X_2$, in much the same manner as the data for the calibration reference table was obtained. The points are expressed as x values because the deviation of the travel path of the y-axis will occur in the x direction. The perpendicular distance between each arbitrary point and its corresponding point on the absolute traversing path is then measured and compared with the corresponding distance stored in the calibration reference table. Any difference between the distances yields the exact amount of further offset at that point. The procedure is illustrated in FIG. 3.

After the exact amount of further offset at all of the arbitrary points is obtained, a slope of change or a deviation rate can be obtained by dividing the difference of the exact amount of further offset between points $X_1$ and $X_2$ by a linear distance between points $X_1$ and $X_2$. Once this deviation rate is obtained for both the x and y axes, a deviation in the angular displacement between the two axes can be formulated and the correction reference table can be updated with the calculated results.

For example, at arbitrary points $X_1$ and $X_2$, the perpendicular distances $D_1$ and $D_2$ between the absolute coordinate and the edge as recorded in the correction reference table is 2.3" and 2.5", respectively. The newly measured distances $D_1'$ and $D_2'$ at arbitrary points $X_1$ and $X_2$ are 2.4" and 2.7", respectively. The exact amount of further offset at points $X_1$ and $X_2$ are:

$$\Delta D_1 = D_1' - D_1 = 2.4 - 2.3 = 0.1$$
$$\Delta D_2 = D_2' - D_2 = 2.7 - 2.5 = 0.2.$$

Knowing the table at points $X_1$ and $X_2$ have been moved away from the absolute coordinate by 0.1" and 0.2" respectively, the same amounts are reflected in the correction reference table at the same points so that the axes are directed to travel further by the same further offset amount to reach the respective points of the edge.

Assuming the linear distance $D_{X1-X2}$ between $X_1$ and $X_2$ is 50 inches, then the slope or deviation rate would be:

$$M_y = (\Delta D_2 - \Delta D_1)/D_{X1-X2}, \text{ or}$$

$$m_y = (0.2 - 0.1)/50 = 0.002/\text{in}.$$

Knowing this deviation rate characteristic, any point along the same edge can be calculated, thus, the entire correction reference table can be updated. For example, assuming a revised perpendicular distance $D_3'$ corresponding to a point $X_3$ on the edge of the table is needed, $D_3'$ can be derived by the following formulas:

$$M_y = ((D_2' - D_2) - (D_3' - D_3))/D_{X2-X3}; \text{ or}$$

$$M_y = ((D_1' - D_1) - (D_3' - D_3))/D_{X1-X3};$$

solving for $D_3'$, $$D_3' = D_2' - D_2 + D_3 - m_x \cdot D_{X2-X3}, \text{ or}$$

$$D_3' = D_1' - D_1 + D_3 - m_x \cdot D_{X1-X3};$$

$M_y$, $D_2'$, $D_2$, $D_3$, $D_1'$, $D_1$, $D_{X2-X3}$, and $D_{X1-X3}$ being known values, $D_3'$ can be easily calculated. There may be other methods of calculation known to a person of ordinary skill in the art.

Figure 4:
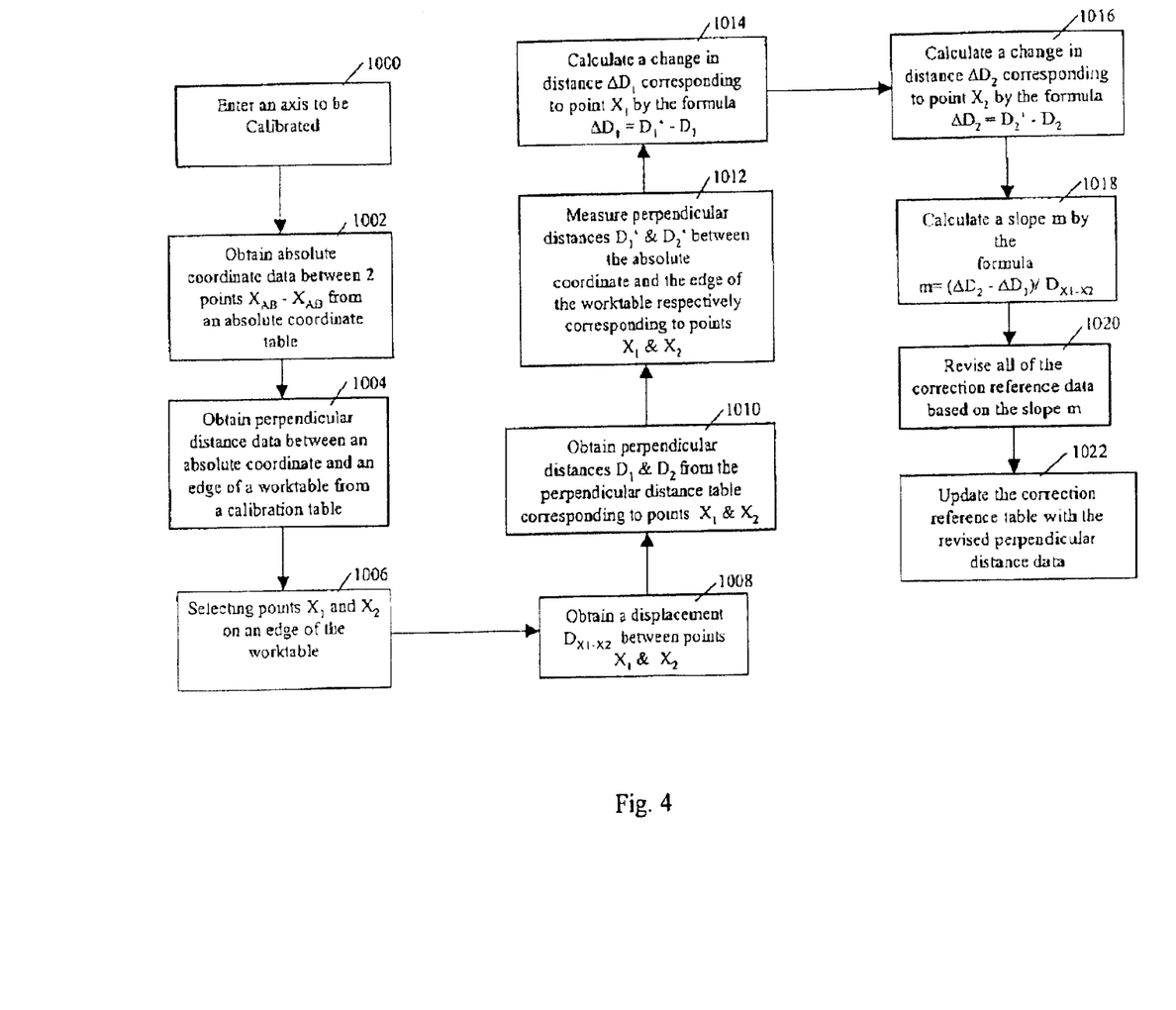
FIG. 4 is a flow chart showing the sequential process of automatically calibrating a linear axis.

FIG. 4 discloses a method of calibrating an axis, in particular the y-axis, of a CNC machine as explained above. The aforementioned calibration probe is first attached to the workhead of the CNC machine with the probe stylus disposed in vertical orientation, perpendicular to the x-y plane. To initiate the calibration process, the operator enters an axis to be calibrated, as shown in step 1000. Absolute coordinate data along an absolute line $X_{AB}$—$X_{AB}$ are obtained from an absolute coordinate table, as shown in step 1002. Perpendicular distance data between the absolute coordinate and an edge of a worktable are obtained from a perpendicular distance table, as shown in step 1004. Two points $X_1$ and $X_2$ situated along the edge of the worktable are selected, as shown in step 1006. A displacement $D_{X1-X2}$ between points $X_1$ and $X_2$ is either obtained or measured, as shown in step 1008. Perpendicular distances $D_1$ and $D_2$ respectively corresponding to points $X_1$ and $X_2$ are obtained from the calibration reference table, as shown in step 1010. Distances $D_1'$ and $D_2'$ respectively corresponding to points $X_1$ and $X_2$ are measured between the absolute coordinate and the edge of the table, as shown in step 1012. Changes in perpendicular distances are calculated by the formulas $\Delta D_1 = D_1' - D_1$ and $\Delta D_2 = D_2' - D_2$, as shown in steps 1014 and 1016. A slope $M_y$ by the formula $M_y = (\Delta X_2 - \Delta X_1)/D_{X1-X2}$, as shown in step 1018. Once the slope or deviation rate is calculated, all correction reference data can be revised by recalculating all the perpendicular distance data taken in consideration of the deviation rate or slope $M_y$, as shown in step 1020. The correction reference table can be updated with the revised perpendicular distance data, as shown in step 1022.

The preceding process is then repeated to calculate the slope of change for the x-axis, $m_x$, and the z-axis, $m_z$. By comparing the magnitude and direction of $M_y$ with that of $m_x$, the degree of angular offset between the traversing paths of the two axes is calculated and stored in the correction reference table. Based on the angular offset data, the servo positioning data for each axis is modified during machine operation to correct for any angular offsets that may have developed between the various axes. For example, the linear excursion of the x-axis will have an angular bias created by adding a slight amount of movement from the y-axis to correct for mechanically induced offsets.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method for calibrating an axis of a machine, said axis having an initial angular displacement between an absolute traversing path corresponding to said axis and a reference surface, said method comprising:
   moving a toolhead along the absolute traversing path corresponding to said axis;
   determining a subsequent angular displacement representing the angle between said absolute traversing path and the reference surface;
   determining a correction angular offset between said subsequent angular displacement and the initial angular displacement; and
   resetting said axis by rotating said axis by an amount corresponding to said correction angular offset so that said axis is coplanar to said initial angular displacement.

2. The method according to claim 1, including repeating the method for each of first and second axes of said machine.

3. The method according to claim 1, wherein determining the initial angular displacement corresponding to said axis includes:
   moving said toolhead along said absolute traversing path corresponding to said axis; and
   determining the relationship between said absolute traversing path and said reference surface.

4. The method according to claim 1, including mounting a measuring probe in said toolhead to determine said correction angular offset and said initial angular displacement.

5. The method according to claim 2, including calibrating a third axis having a third and fourth initial displacement between an absolute traversing path corresponding to said third axis and a third and fourth reference surface, which includes:
   moving a toolhead along the absolute traversing path corresponding to said third axis;
   determining a third subsequent angular displacement representing the angle between said third absolute traversing path and the third reference surface;
   determining a third correction angular offset between said third subsequent angular displacement and the third initial angular displacement with respect to said third axis;
   moving a toolhead again along said third absolute traversing path;
   determining a fourth subsequent angular displacement representing the angle between said third absolute traversing path and the fourth reference surface;
   determining a fourth correction angular offset between said fourth subsequent angular displacement and the fourth initial angular displacement with respect to said third axis; and
   resetting said third axis by rotating said third axis by an amount corresponding to said third and fourth correction angular offsets so that said third axis is coplanar to said third and fourth initial annular displacements, respectively.

6. The method according to claim 3, including repeating the determining of said initial angular displacement for each of first and second axes.

7. The method according to claim 3, including mechanically calibrating the machine prior to determining the initial calibration.

8. The method according to claim 4, wherein moving said toolhead along said absolute traversing path corresponding to said axis includes moving said toolhead to two reference points along a predetermined path.

9. The method according to claim 6, including determining a third and fourth initial angular displacements for a third axes which includes:
   moving said toolhead along a third absolute traversing path;
   determining a third relationship between said third absolute traversing path and a third reference surface;
   moving said toolhead again along said third absolute traversing path; and
   determining a fourth relationship between said absolute traversing path and a fourth reference surface.

10. The method according to claim 8, including determining said correction angular offset and said initial angular displacement by comparing the slope of said reference surface to an axis-line formed by said absolute traversing path.

11. A system for calibrating a machine, comprising:
   means to control motion of a toolhead of said machine;
   means to detect motion of said toolhead comprising motion along a first, second and third absolute traversing paths; and
   means to store data relating to movement of said toolhead comprising a calibration reference table and a correction reference table,
   wherein said calibration reference table comprises a first initial angular displacement between said motion along said first absolute traversing path and a first reference surface, a second initial angular displacement between said motion along said second absolute traversing path and a second reference surface, a third initial angular displacement between said motion along said third absolute traversing path and a third reference surface, and a fourth initial angular displacement between said motion along said third absolute traversing path and a fourth reference surface.

12. The system according to claim 11, wherein the means to control motion uses data stored in said correction reference table in conjunction with said calibration reference table to calibrate the motion of the toolhead along a first, second and third axes.

13. The system according to claim 11, wherein the means to detect motion comprises a measuring probe mounted in said toolhead of said machine.

14. The system according to claim 12, wherein said correction reference table comprises data representing first, second, third and fourth angular displacements determined by comparing a subsequent motion along each of said first and second absolute traversing paths to said first and second initial angular displacements, respectively, and by comparing a subsequent motion along said third absolute traversing path to said third and fourth initial angular displacements.

15. The system according to claim 12, wherein motion of said toolhead along each of said first, second and third absolute traversing paths comprises moving said toolhead to at least two points.

16. A method for calibrating an axis of a machine which has a correction reference table for maintaining data relating to the location of said axis, including:
   attaching a probe to a toolhead of said machine,
   entering an axis of said machine to be calibrated, obtaining absolute coordinate data for first and second points from a coordinate table;
   moving said toolhead to each of said first and second points consecutively, determining a distance between said first and second points (D), obtaining a stored distance from a calibration reference table representing a stored initial distance between each of first and second points and a reference surface ($X_1$ and $X_2$);
   measuring a perpendicular distance from each of said first and second points to said reference surface on said machine ($X_1'$ and $X_2'$);
   determining a change in distance between the stored distances and the measured distances for each of said first and second points ($D_1=D_1-D_1'$ and $D_2=D_2-D_2'$);
   calculating a slope of change from the stored distances to the measured distances (slope $m=((X_1-X_2)/D)$); and
   revising said data in said correction reference table based on said slope to revise the location of said axis.

17. The method according to claim 16, wherein creating said calibration reference table for said axis includes:
   mechanically calibrating the machine, attaching said probe to said toolhead of said machine, entering said axis of said machine to be calibrated, obtaining absolute coordinate data for a plurality of points from a coordinate table;
   moving said toolhead to each of said points consecutively;
   measuring a perpendicular distance from each of said plurality of points to said reference surface on said machine; and
   storing said plurality of points along with their respective perpendicular distances as said stored distances in said calibration reference table.

* * * * *